Oct. 4, 1932. W. B. WINGERT 1,880,631
DIRECT RECOVERY OF AMMONIUM SULPHATE FROM HOT GAS
Filed Jan. 24, 1929
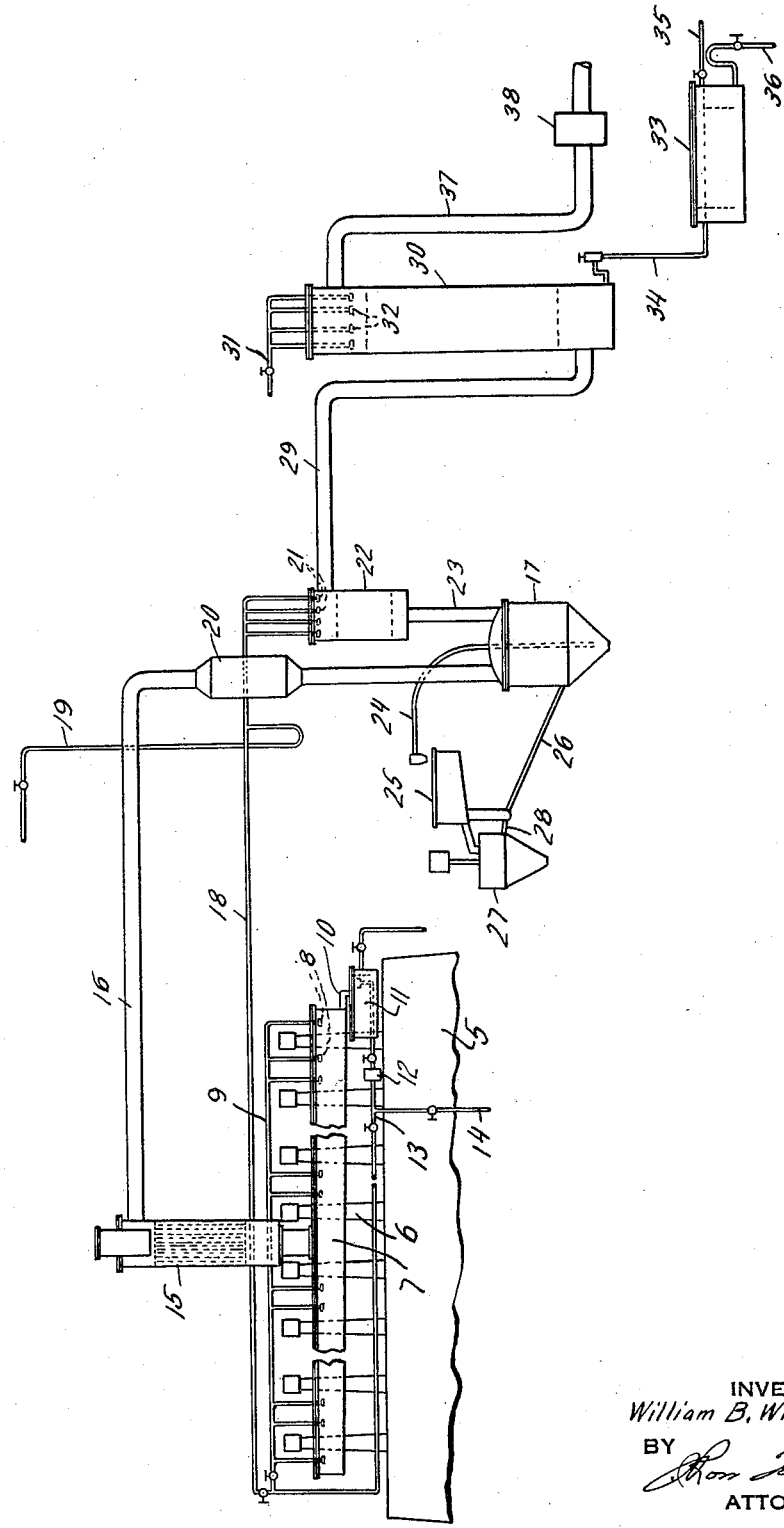
INVENTOR
William B. Wingert
BY
ATTORNEY Patented Oct. 4, 1932

1,880,631

UNITED STATES PATENT OFFICE

WILLIAM B. WINGERT, OF DETROIT, MICHIGAN, ASSIGNOR TO SEMET-SOLVAY COMPANY, OF NEW YORK, N. Y., A CORPORATION OF NEW YORK

DIRECT RECOVERY OF AMMONIUM SULPHATE FROM HOT GAS

Application filed January 24, 1929. Serial No. 334,753.

This invention relates to the distillation of coal and more particularly to the recovery of ammonium sulphate from gases produced by coal distillation. It affords an improved and more economical recovery of ammonium sulphate.

In ordinary by-product recovery systems employed in connection with coal distillation plants, the ammonia liquor is distilled to separate ammonia which is thereafter combined with sulphuric acid to produce ammonium sulphate. Such operation requires the installation and maintenance of the still and involves considerable expense for fuel. The disadvantages of such a system are evident.

It is the object of the present invention to simplify the procedure and to provide a method and apparatus whereby ammonium sulphate may be produced directly, the superheat of the gases being utilized to effect the evaporation of the ammonia liquor.

The invention may be applied to coal distillation plants of various kinds, including retorts and the like, but is adapted particularly for application to coke ovens. Such ovens are provided with a collector main into which the gases from the ovens are discharged. In the collector main the gases which leave the ovens at relatively high temperature, i. e. 700° C. or higher, are subjected to sprays of ammonia liquor. The ammonia liquor is withdrawn from the collector main and recirculated therethrough. Water may be added to make up loses due to evaporation and to maintain the concentration of the fixed ammonia within suitable limits as, for example, 20 to 30 grams per liter. The cooling of the gases in the collector main causes separation of the heavy tarry constituents therefrom. The tar thus collected is withdrawn with the ammonia liquor and separated therefrom by a suitable decanter, thus permitting recirculation of the ammonia liquor. The tar may be removed and subjected to further treatment by distillation or otherwise.

The gases, from which the major portion of the tar has been separated, are passed preferably through an electrical precipitator to remove any traces of tar which may remain therein. The precipitator may be, for example, the well-known Cottrell precipitator, and it should be operated at a temperature such as to permit the separation of the heavy tarry constituents.

The operation of an electrical precipitator as commonly used consists in passing the gas to be treated between electrodes whose difference in electrical potential is very great. Experience has shown that it is best to use a rectified alternating current. The alternating current (the primary) is sent through a step-up transformer to produce a high potential current (the secondary) which is then rectified to an intermittent uni-directional current, for example by means of a rotary converter. The rectified current is delivered from the converter to the electrical precipitator at practically the potential at which it leaves the transformer.

The electrical precipitator consists commonly of a group of vertical pipes with a wire or rod in the center of each, the pipes being connected to proper headers for the introduction and discharge of the gases. The pipes generally constitute the positive electrodes and the wires or rods the negative electrodes. The size of the pipes may vary, but in general pipes less than 6 inches in diameter are not used. Electrical precipitators with pipes 6 inches in diameter, using secondary voltages from 35,000 to 50,000 volts, are satisfactory for the purpose of this invention. It is generally best to operate with maximum potential difference (secondary current) between the electrodes, this maximum being just below the break-down voltage at which arcing occurs.

The efficiency of the cleaning is dependent upon several variables. Satisfactory cleaning of the gas may be accomplished if the time of treatment is of the order of one second, although this time may be varied widely depending upon the character of the material to be separated. In working with tubes 9 feet long and 6 inches in diameter, for example with a gas velocity of from 6 to 4.5 feet per second, an efficiency of cleaning of approximately 99% can be maintained. The tar which is separated in the precipitator may be returned to the collector main.

The gases which are freed from tarry constituents in the electrical precipitator are delivered to the cross-over main and are subjected to further cooling therein, the temperature being reduced to about 100° C.

The cooled gases are delivered directly to the ammonia saturator and are subjected therein to contact with ammonia liquor withdrawn from the liquor which circulates through the collector main and which is acidified by the addition of a regulated quantity of sulphuric acid previous to its introduction into the saturator. Preferably the acidified ammonia liquor is preheated in any suitable manner to facilitate evaporation of the liquor by the outgoing gas. Before the acidified ammonia liquor enters the saturator it is preferably brought into contact with the gases leaving the saturator. These gases are superheated with respect to the water vapor content because of the lowered vapor tension of water above the saturated solution of ammonium sulphate containing from 5.0 to 10.0% of sulphuric acid. Consequently the gases will evaporate and thereby concentrate the ammonia liquor which, being thus concentrated, is delivered to the saturator and subjected to further concentration therein, so that the ammonium sulphate is separated.

Liquor carrying the ammonium sulphate in suspension may be delivered to a sludge box wherein the liquor is separated and from which it is returned to the saturator. The solid ammonium sulphate may be delivered then to a centrifugal or other device to permit the removal of additional liquor after which the substantially dry ammonium sulphate is withdrawn and utilized for any desired purpose.

The gases, after contact with the acidified ammonia liquor and carrying the water vapor produced by such contact, are delivered to the final cooler and subjected therein to direct contact with water for the purpose of separating carbolic oil. The carbolic oil and water are delivered to a decanter in which the oil is separated from the water and conveyed to any suitable storage receptacle. The gases pass from the final cooler through an exhauster which maintains the circulation of gases in the system, and pass thence to the benzol scrubber in which final traces of condensible constituents are removed. Thereafter the gases may be delivered to a gasometer and stored until they are utilized.

The invention as described involves the direct recovery of ammonium sulphate from coal distillation gases. As will be noted, the gases after cleaning, which effects the separation of tar, are brought into direct contact with ammonia liquor produced in the system and likewise free from tar. The ammonia carried by the gases and in the ammonia liquor is combined in the saturator with sulphuric acid, and the heat carried by the gases is utilized to effect evaporation and concentration of the ammonia liquor to permit the separation of solid ammonia sulphate. The ammonium sulphate is thus recovered directly and without the necessity of providing and operating an ammonia still.

The invention will be more readily understood by reference to the following detailed description and the accompanying drawing which diagrammatically represents apparatus suitable for the practice of the method. It is to be understood that details of the apparatus which are well-known to those skilled in the art are omitted for the purpose of clarity.

Referring to the drawing, 5 indicates a block of coke ovens having uptakes 6, which are connected to a collector main 7 so that the coal distillation gases are delivered from the ovens to the collector main. The collector main is provided with a plurality of spray nozzles 8 which are supplied through a pipe 9 with ammonia liquor. The cooling thus effected in the collector main results in the separation of the tarry constituents which accumulate and are withdrawn together with the ammonia liquor through a pipe 10, and are delivered to a decanter 11 in which the ammonia liquor is separated from the tar. The tar may be delivered to a suitable storage receptacle and utilized as desired. The ammonia liquor is returned through a pump 12 and pipe 13 to the pipe 9, and is thus constantly circulated. Water may be introduced as desired through a pipe 14 to maintain the ammonia liquor at the proper concentration.

The gases, after cooling in the collector main, are delivered to an electrical precipitator 15 which, as hereinbefore noted, may be an ordinary Cottrell precipitator operated at a temperature such as to effect the separation of any remaining tarry constituents in the gases. The tar may be returned to the collector main or withdrawn separately. The gases, after cleaning in the precipitator, are delivered to the cross-over main 16 in which they are further cooled by radiation. The cross-over main delivers the gases to the ammonia saturator 17.

The surplus ammonia liquor is withdrawn from the pipe 9 by a pipe 18. Sulphuric acid in suitable and regulated proportions is delivered to the pipe 18 from a pipe 19 and mingles with the ammonia liquor. Thereafter the mixed acid and ammonia liquor may be delivered to a preheater 20 wherein it is subjected to any suitable heating medium such as the cleaned gases. The heated mixture of ammonia liquor and sulphuric acid is delivered then through spray nozzles 21 to a gas saturator 22. The latter is connected to the saturator 17 by a pipe 23 so that the gases, after passing through the saturator 17, enter the gas saturator 22. These gases, being capable of absorbing water vapor, effect a partial evaporation of water contained in the ammonia liquor which travels through the pipe 23 into the saturator 17 and is subjected to further contact with the gases therein.

Ammonium sulphate separates in the saturator 17, and the liquor carrying the ammonium sulphate in suspension is delivered by a pipe 24 to a sludge box 25 in which the major portion of the liquor separates. The liquor is returned to the saturator through a pipe 26. The solid ammonium sulphate then passes into a centrifugal 27 in which the remainder of the liquor is separated and from which it is returned through a pipe 28 to the saturator 17. The solid ammonium sulphate is recovered from the centrifugal and may be utilized for any suitable purpose.

From the gas saturator 22 the gas is delivered through pipe 29 to the final cooler 30 wherein it is subjected to contact with water supplied through a pipe 31 to spray nozzles 32. The final cooling effects the separation of carbolic oil, and the water and oil are delivered to a decanter 33 through a pipe 34. The cleaned oil escapes through a pipe 35, and the water is discharged through a pipe 36.

The gas continues from the cooler through a pipe 37 to an exhauster 38 and is delivered thence to the benzol scrubbers (not shown).

While I have described the preferred procedure and an apparatus suitable for the practice thereof, it is to be understood that various changes may be made in the details of operation and in the apparatus employed without departing from the invention or sacrificing any of its advantages.

I claim:

1. The process of recovering ammonium sulphate from coal distillation gases, which comprises passing the gases through a saturator having ammonium sulphate in solution containing sulphuric acid, whereby the ammonia content of the gases is converted into ammonium sulphate and the gas is superheated with respect to its water vapor content, contacting the gas leaving the saturator with acidified ammonia liquor passing to the saturator, thus concentrating the acidified ammonia liquor by effecting a partial evaporation of its water content, and passing the concentrated ammonia liquor into the saturator.

2. The process of recovering ammonium sulphate from coal distillation gases, which comprises removing tarry constituents from the gases, passing the tar-free gases through a saturator having ammonium sulphate in a solution containing an excess of sulphuric acid, whereby the ammonia content of the gas is converted into ammonium sulphate and the gas is superheated with respect to its water vapor content, contacting the ammonia-free gas leaving the saturator with ammonia liquor acidified with sulphuric acid, thus concentrating the acidified ammonia liquor by effecting a partial evaporation of its water content, and passing the concentrated acidified ammonia liquor into the saturator.

3. The method of recovering ammonium sulphate from coal distillation gases, which comprises recirculating liquid into contact with the gases to remove fixed ammonia therefrom, removing tarry constituents from the gases, passing the tar-free gases through an ammonium sulphate saturator containing an excess of sulphuric acid, whereby the free ammonia content of the gases is converted to ammonium sulphate, removing a portion of the recirculated liquor containing fixed ammonia, acidifying the removed portion of the fixed ammonia liquor, passing the gases from the saturator through the acidified fixed ammonia liquor, thereby concentrating this liquor, and passing the concentrated liquor into the saturator.

4. The method of recovering ammonium sulphate from coal distillation gases, which comprises recirculating liquid into contact with the gases to remove fixed ammonia therefrom, removing tarry constituents from the gases, passing the tar-free gases at a temperature sufficient to maintain carbolic oils in the vapor phase through an ammonium sulphate saturator, whereby the free ammonia content of the gas is converted to ammonium sulphate, removing a portion of the recirculated liquor containing fixed ammonia, acidifying the removed portion of the liquor with sulphuric acid, passing the gas from the saturator through the acidified fixed ammonia liquor to concentrate this liquor, and passing the concentrated liquor into the saturator.

In testimony whereof, I affix my signature.

WILLIAM B. WINGERT.